United States Patent [19]

Kobayashi et al.

[11] Patent Number: 4,662,924
[45] Date of Patent: May 5, 1987

[54] METHOD FOR MOLDING CALCIUM PHOSPHATE TYPE GLASS

[75] Inventors: Shigeyoshi Kobayashi, Kawasaki; Tsuneo Manabe, Yokohama, both of Japan

[73] Assignee: Asahi Glass Company, Ltd., Tokyo, Japan

[21] Appl. No.: 839,076

[22] Filed: Mar. 12, 1986

[30] Foreign Application Priority Data

Mar. 12, 1985 [JP] Japan .................................. 60-47522
Mar. 19, 1985 [JP] Japan .................................. 60-53416

[51] Int. Cl.⁴ ......................... C03B 19/02; C03C 1/04
[52] U.S. Cl. ............................................ 65/66; 65/68; 65/71; 65/77; 65/374.13; 501/10; 501/45
[58] Field of Search ................. 65/374.13, 66, 68, 71, 65/72, 77; 501/10, 45

[56] References Cited

U.S. PATENT DOCUMENTS

| | | | |
|---|---|---|---|
| 2,201,049 | 5/1940 | Moore | 65/374.13 X |
| 4,115,504 | 9/1978 | Dewitte et al. | 65/72 X |
| 4,139,677 | 2/1979 | Blair et al. | 65/66 X |
| 4,251,254 | 2/1981 | Klomp et al. | 65/374.13 |
| 4,348,484 | 9/1982 | Joormann et al. | 501/45 |
| 4,363,879 | 12/1982 | Broemer et al. | 65/66 X |
| 4,560,666 | 12/1985 | Yoshida et al. | 501/10 X |

*Primary Examiner*—Arthur Kellogg
*Attorney, Agent, or Firm*—Oblon, Fisher, Spivak, McClelland & Maier

[57] ABSTRACT

A method for molding calcium phosphate type glass, which comprises pouring a melt of calcium phosphate into a mold, and cooling and solidifying it, wherein the mold contains boron nitride at least at the surface thereof.

4 Claims, No Drawings

METHOD FOR MOLDING CALCIUM PHOSPHATE TYPE GLASS

The present invention relates to a method for molding calcium phosphate type glass.

Ceramics having activities to living bodies are expected to be prospective materials for artificial bones for surgery or for artificial teeth. As typical examples of such ceramics, there may be mentioned a sintered product of hydroxyapatite and a sintered product of tri-calcium phosphate. Artificial bones for surgery or artificial teeth have complicated shapes which are not uniform, and they are required to have high levels of dimensional precision. With the above-mentioned sintered products, it is very difficult to obtain shaped articles having such high levels of dimensional precision.

Crystallizable glass material has been studied as a ceramic material to obtain such a shaped product, and calcium phosphate type crystallized glass has been reported in Japanese Examined Patent Publication No. 11625/1980. This report describes a process wherein a melt of calcium phosphate type glass is shaped while being solidified and vitrified, and then the glass formed is crystallized to obtain a crystallized glass.

Further, as a material for the mold useful for forming such calcium phosphate type glass, it has been proposed to employ a gypsum-bonded investment or a phosphate-bonded investment (Japanese Unexamined Patent Publication No. 141509/1984).

However, the gypsum-bonded investment vigorously reacts with the calcium phosphate type glass at a temperature of about 700° C. to discharge $SO_2$ gas. Thus, it brings about a drawback that the molded glass tends to include air bubbles, and when such glass is crystallized, the strength tends to deteriorate. Further, a reaction layer is formed between the mold and the glass, whereby it becomes difficult to separate the molded glass product from the mold, and the resulting molded glass product tends to have a low dimensional precision.

On the other hand, the phosphate-bonded investment does not form air bubbles in the glass. However, it likewise tends to lead to the formation of a reaction layer between the mold and the glass, whereby the dimensional precision of the molded glass product is low.

It is an object of the present invention to prevent such a reaction between the casting mold and the molten glass and to obtain a molded product of a calcium phosphate type glass containing no air bubbles or no foreign matters with a high level of dimensional precision.

The present invention provides a method for molding calcium phosphate type glass, which comprises pouring a melt of calcium phosphate into a mold, and cooling and solidifying it, wherein the mold contains boron nitride at least at the surface thereof.

Now, the present invention will be described in detail with reference to the preferred embodiments.

In the present invention, the mold contains boron nitride at least at the surface which is in contact with the molten glass, i.e. in the surface layer with a thickness of at least 1 $\mu m$, preferably at least 10 $\mu m$.

The content of boron nitride is usually at least 1% by weight, preferably at least 10% by weight, more preferably at least 30% by weight. If the content of boron nitride is less than 1% by weight, the effectiveness for reducing the wettability of the mold with glass tends to be inadequate.

On the other hand, there is a certain upper limit in the content of boron nitride in order to maintain the bonding strength. Namely, in a case where boron nitride itself forms a layer having adequate bonding strength, for instance, in a case where the surface layer containing boron nitride is formed by a CVD method or by a sputtering method, the higher the content of boron nitride, the better. Whereas, in a case where boron nitride powder is bound by a binder such as gypsum, it is usually required to incorporate at least about 10% by weight of a binder, i.e. the content of boron nitride is not higher than about 90% by weight in order to obtain adequate bonding strength of boron nitride to avoid the disintegration.

As other components of the mold to be used in the present invention, conventional materials for molds such as a gypsum-bonded investment, a silicate-bonded investment and a phosphate-bonded investment, may be employed. More specifically, such materials include gypsum, silicon dioxide, magnesium phosphate, aluminum phosphate, aluminum oxide, magnesium oxide and calcium silicate.

For the formation of the layer containing boron nitride, a physical means such as CVD or sputtering may be employed when the layer is formed on the surface of the mold, or a coating, spraying or dipping method may be employed when a composition containing boron nitride is applied to the surface of the mold. Further, it is also possible to employ a method wherein a solution containing boron nitride is preliminarily coated or sprayed onto a master form for the mold surface (i.e. onto a wax pattern in the case of a lost wax method) to form a layer containing boron nitride on the master form, and then the mold is prepared.

There is no particular restriction as to the calcium phosphate type glass to be used in the present invention, so long as it contains at least 90% by weight of calcium phosphate. Calcium phosphate is preferably has an atomic ratio of Ca/P of from 0.35 to 0.7. If the Ca/P ratio is higher than 0.7, it becomes difficult to solidify the melt in a vitrified state. On the other hand, if the ratio is less than 0.35, the water resistance of the resulting glass will be low, and it is practically difficult to use such a glass in a moist atmosphere.

Now, the present invention will be described in further detail with reference to the Examples. However, it should be understood that the present invention is by no means restricted by these specific Examples.

EXAMPLE 1

50% by weight of ethyl silicate, 44% by weight of ethanol, 5% by weight of water and 1% by weight of 1N HCl were thoroughly mixed and then left to stand for 20 hours. To 25 parts by weight of the mixture thereby obtained, 10 parts by weight of boron nitride powder was mixed to obtain a uniform slurry containing about 67% by weight of boron nitride.

The slurry was applied on the surface of a mold comprising a female and male pair of stainless steel mold members to form a coating layer having a thickness of about 200 $\mu m$.

Into this mold, 0.8 g of a block (3×5×20 mm) of calcium phosphate glass (composition: CaO 25 wt. %, $Al_2O_3$ 2 wt. %, $P_2O_3$ 73 wt. %) was introduced, then maintained in an electric furnace at 700° C. for 5 hours under a load of 1 kg exerted to the mold, and then cooled. The molded product was taken out from the mold.

The crystallized calcium phosphate glass thus obtained had a smooth surface, a high level of dimensional precision with a size of (3 mm±0.1 mm)×(3 mm±0.1 mm)×(30 mm±0.1 mm), and a bending strength of 1200 kg/cm$^2$.

EXAMPLE 2

A wax pattern for the preparation of a crown was prepared by applying a molten wax onto a denture mold formed of gypsum. Then, a sprue former was attached to this wax pattern, and then, the pattern was attached to a rubber cone.

To 10 parts by weight of a powder of a phosphate-bonded investment (Blue Test, tradename, manufactured by Tokuyama Soda Co., Ltd.), 5 parts by weight of boron nitride powder and 20 parts by weight of a special solution for the investment, were added and stirred to obtain a uniform slurry containing about 30% by weight of boron nitride. This slurry was coated on the surface of the wax pattern attached to the cone, to form a coating layer having a thickness of from 0.1 to 0.5 mm.

Then, the boron nitride-containing slurry prepared as above, was poured into a casting ring in which the wax pattern was set, so that the wax pattern was invested. After the curing and drying, the assembly was heated at 700° C. to burn off the wax pattern and the sprue former, whereby a lost wax mold for a crown was prepared.

On the other hand, a glass having a composition comprising 24% by weight of CaO, 1% by weight of $Al_2O_3$ and 75% by weight of $P_2O_5$, was melted at a temperature of 1250° C. to obtain a molten glass. This molten glass was introduced into the lost wax mold for a crown, through the sprue, by means of a centrifugal casting machine. Then, the investing mold was maintained in an electric furnace at 680° C. for 3 hours for crystallization. Then, the investment was broken, and the molded product was taken out. Then, the sprue portion was cut off to obtain a crown.

The crown of calcium phosphate crystallized glass thus obtained, had a glossy smooth surface even without being polished. When mounted on the gypsum denture mold used for the preparation of the wax pattern, it fitted thereon very well.

The crown of the crystallized glass had a compressive strength of 7000 kg/cm$^2$ and a bending strength of 1700 kg/cm$^2$.

EXAMPLE 3

10 parts by weight of boron nitride, 20 parts by weight of gypsum, 70 parts by weight of cristobalite and 40 ml of water were thoroughly mixed and kneaded. The mixture was poured into a casting ring in which a wax pattern was placed at the center, and hardened. The mold material thus obtained was then heated at 800° C. for 30 minutes, whereby the wax was burnt off to obtain a mold. Into this mold, a glass melted at 1150° C. and having a composition comprising 30% by weight of CaO and 70% by weight of $P_2O_5$, was introduced by a centrifugal casting method, then maintained at 500° C. for 1 hour, and gradually cooled to room temperature at a rate of 100° C./hr. Then, the mold was broken, and the molded glass product was taken out. The molded glass product thus obtained was free from the formation of a reaction layer with the material of the mold, and the investment attached thereto was readily removed by a tooth brush.

The molded product cleaned by the removal of the investment, had good transparency and showed excellent fitness to the mold.

EXAMPLE 4

Two parts by weight of a curing agent (A-3, manufactured by Kolcoat Co., Ltd.) was added to 200 parts by weight of an ethyl silicate type binder (HAS-6, manufactured by Kolcoat Co., Ltd.), followed by stirring for a few seconds, and then 300 parts by weight of silica sand and 50 parts by weight of boron nitride were added, and thoroughly stirred to obtain a mixture. The mixture was poured into a casting ring in which a wax pattern was placed at the center, and then hardened.

The mold material thus obtained was heated at 700° C. for 30 minutes, whereby the wax was burnt off to obtain a mold. Into this mold, a glass melted at 1250° C. and having a composition comprising 27% by weight of CaO and 73% by weight of $P_2O_5$, was introduced by a centrifugal casting method, then maintained at 500° C. for 30 minutes, and gradually cooled to room temperature at a rate of 100° C./hr, and then the mold was broken, and the molded glass product was taken out.

The molded glass product was free from the formation of a reaction layer with the material of the mold, and the investment attached thereto was readily removed by sand blasting. The molded product cleaned by the removal of the investment, had good transparency and excellent fitness to the mold.

EXAMPLE 5

To 100 parts by weight of a powder of a phosphate-bonded investment (Blue Test, tradename, manufactured by Tokuyama Soda Co., Ltd.), 30 parts by weight of boron nitride and 40 parts by weight of a special solution for the investment, were added and stirred, and the mixture was defoamed in vacuum.

The mixture thus obtained was poured into a casting ring in which a wax pattern was placed at the center, and hardened.

The mold material thus obtained, was heated at 600° C. for 1 hour, whereby the wax was burnt off to obtain a mold. Into this mold, a glass melted at 1250° C. and having a composition comprising 25% by weight of CaO, 2% by weight of $Al_2O_3$ and 73% by weight of $P_2O_5$, was introduced by a centrifugal casting method, then maintained at 700° C. for 2 hours, and cooled to room temperature over a period of 1 hour. Then, the mold was broken, and the molded glass product was taken out.

The molded glass product was free from the formation of a reaction layer with the material of the mold, and the investment attached thereto was readily removed by a tooth brush.

The molded glass product cleaned by the removal of the investment, had good transparency and excellent fitness to the mold.

COMPARATIVE EXAMPLE

To 100 parts by weight of a powder of a phosphate-bonded investment (Blue Test, tradename, manufactured by Tokuyama Soda Co., Ltd.), 20 parts by weight of a special solution for the investment was added and stirred, and the mixture was defoamed in vacuum. Thereafter, a molded product of crystallized glass was prepared in the same manner as in Example 5. The molded product cleaned by the removal of the investment with a tooth brush, had a white opaque layer having a thickness of 100 μm with a rough surface, and the fitness to the mold was inferior.

We claim:

1. A method for molding calcium phosphate type glass, which comprises pouring a melt of calcium phosphate into a mold, and cooling and solidifying it, wherein the mold contains boron nitride at least at the surface thereof.

2. The method according to claim 1, wherein the boron nitride content is from 1 to 90% by weight.

3. The method according to claim 1, wherein the mold is made essentially of a material selected from a phosphate, a silicate and gypsum.

4. The method according to claim 1, wherein the mold contains boron nitride in its surface layer with a thickness of at least 1 μm.

* * * * *